(12) United States Patent
Suzuki

(10) Patent No.: US 11,241,914 B2
(45) Date of Patent: Feb. 8, 2022

(54) PNEUMATIC TIRE

(71) Applicant: The Yokohama Rubber Co., LTD., Tokyo (JP)

(72) Inventor: Takahiro Suzuki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 409 days.

(21) Appl. No.: 15/750,808

(22) PCT Filed: Aug. 4, 2016

(86) PCT No.: PCT/JP2016/073004
§ 371 (c)(1),
(2) Date: Feb. 6, 2018

(87) PCT Pub. No.: WO2017/022837
PCT Pub. Date: Feb. 9, 2017

(65) Prior Publication Data
US 2018/0222253 A1     Aug. 9, 2018

(30) Foreign Application Priority Data

Aug. 6, 2015   (JP) .............................. JP2015-155832

(51) Int. Cl.
*B60C 5/14*     (2006.01)
*B60C 3/06*     (2006.01)
*B60C 9/02*     (2006.01)

(52) U.S. Cl.
CPC .................. *B60C 5/14* (2013.01); *B60C 3/06* (2013.01); *B60C 9/02* (2013.01)

(58) Field of Classification Search
CPC ............ B60C 17/0009; B60C 17/0072; B60C 2009/0223; B60C 9/30; B60C 17/08; B60C 3/06; B60C 2017/0072
(Continued)

(56) References Cited

U.S. PATENT DOCUMENTS 3,789,900 A * 2/1974 Verdier ..................... B60C 3/04
152/548
3,916,968 A * 11/1975 Masson ............... B60C 11/0075
152/454
(Continued)

FOREIGN PATENT DOCUMENTS

EP          2727743 A1 *  5/2014
JP          H05-092708     4/1993
(Continued)

OTHER PUBLICATIONS

English Translation of Nishitani, Kazuma; "Pneumatic Radial Tire"; (2003); JP-2003326917-A (Year: 2003).*
(Continued)

*Primary Examiner* — Robert C Dye
*Assistant Examiner* — Edgaredmanuel Troche
(74) *Attorney, Agent, or Firm* — Thorpe North & Western

(57) ABSTRACT

A pneumatic tire is provided in which an inner tie rubber layer and an outer tie rubber layer are selectively disposed between a carcass layer and an innerliner layer in a region on both sides in a tire width direction excluding a center region of a tread portion. End portions of the inner tie rubber layer and outer tie rubber layer on a tire equator side are disposed within a range of from 10 mm to 25 mm on an inner side in the tire width direction from an end portion on an outermost side in the tire width direction of a belt layer. A rubber thickness t1 of the inner tie rubber layer differs from a rubber thickness t2 of the outer tie rubber layer. A rubber thickness of the outer tie rubber layer is from 120% to 200% a rubber thickness of the inner tie rubber layer.

10 Claims, 4 Drawing Sheets

(58) Field of Classification Search
USPC .......................................................... 152/549
See application file for complete search history.

(56) References Cited

U.S. PATENT DOCUMENTS

| | | | | | |
|---|---|---|---|---|---|
| 4,120,339 | A | * | 10/1978 | Shichman | ................. B60C 9/28 152/526 |
| 4,186,789 | A | * | 2/1980 | Verdier | ................... B60C 9/09 152/454 |
| 4,779,658 | A | * | 10/1988 | Kawabata | ................. B60C 9/14 152/517 |
| 5,280,817 | A | * | 1/1994 | Liu | ......................... B60C 13/00 152/454 |
| 5,769,983 | A | * | 6/1998 | Nishigata | ............... B60C 13/00 152/517 |
| 6,123,132 | A | * | 9/2000 | Appleton | ................ B60C 5/142 152/458 |
| 6,415,840 | B1 | * | 7/2002 | Nishikawa | ............... B60C 9/09 152/458 |
| 6,622,764 | B2 | * | 9/2003 | Allen | .................... B60C 9/1821 152/531 |
| 6,634,397 | B1 | * | 10/2003 | Oare | ........................ B60C 9/12 152/458 |
| 2007/0012391 | A1 | * | 1/2007 | Willard, Jr. | ......... B60C 17/0009 152/455 |
| 2008/0006359 | A1 | | 1/2008 | Yamashita | |
| 2009/0008014 | A1 | * | 1/2009 | Segawa | .................... B60C 3/06 152/517 |
| 2011/0253282 | A1 | * | 10/2011 | Kaplan | .................... B60C 1/00 152/540 |
| 2017/0157985 | A1 | * | 6/2017 | Aoki | .................. B60C 15/0603 |

FOREIGN PATENT DOCUMENTS

| | | | | |
|---|---|---|---|---|
| JP | 11334315 | A | * 12/1999 | ......... B60C 17/0009 |
| JP | 2002-178714 | | 6/2002 | |
| JP | 2003326917 | A | * 11/2003 | ......... B60C 11/0058 |
| JP | 2005199758 | A | * 7/2005 | ............... B60C 9/09 |
| JP | 2006151326 | A | * 6/2006 | ............... B60C 9/09 |
| JP | 2009-279974 | | 12/2009 | |
| JP | 2009279974 | A | * 12/2009 | |
| JP | 2011-255786 | | 12/2011 | |
| JP | 5239507 | | 7/2013 | |

OTHER PUBLICATIONS

Machine English Translation of JP-2009279974-A (Year: 2009).*
Machine English Translation of JP-11334315-A (Year: 1999).*
Machine English Translation of JP-2005199758-A (Year: 2005).*
Machine English Translation of JP-2006151326-A (Year: 2006).*
AGCO_Automotive_Repair_Service_—_Baton_Rouge_LA_—_Detailed_Auto_Topics_—_Tire (Year: 2020).*
International Search Report for International Application No. PCT/JP2016/073004 dated Oct. 25, 2016, 4 pages, Japan.

* cited by examiner

PNEUMATIC TIRE

TECHNICAL FIELD

The present technology relates to a pneumatic tire provided with a partial tie rubber layer selectively disposed on a portion between a carcass layer and innerliner layer, and particularly relates to a pneumatic tire capable of reducing tire weight and rolling resistance while maintaining handling stability on a dry road surface.

BACKGROUND ART

In general, for a pneumatic tire, when an unvulcanized tire is inflated when manufacturing a tire, a tie rubber layer is disposed between a carcass layer and innerliner layer in order to prevent a carcass cord from biting into the innerliner layer.

In recent years, for this tie rubber layer, using a partial tie rubber layer selectively disposed on a portion and not an entire region between the carcass layer and innerliner layer has been proposed in order to achieve a reduction in tire weight and rolling resistance (for example, refer to Japan Patent No. 5239507). This partial tie rubber layer is disposed on at least a shoulder region (site where engaging of the carcass cord easily occurs when inflating due to a large curvature), and therefore, a sufficient effect can be achieved as compared to a conventional tie rubber layer (full tie rubber layer) disposed on an entire region between the carcass layer and innerliner layer.

However, simply removing a portion of the full tie rubber layer to achieve a partial tie rubber layer has problems where rigidity is reduced as compared to a conventional tire using a full tie rubber layer, and thus sufficiently maintaining handling stability performance (dry handling stability) is difficult. Therefore, when reducing tire weight and rolling resistance using a partial tie rubber layer, further improvement for preventing reduction in dry handling stability performance is required.

SUMMARY

The present technology provides a pneumatic tire with a partial tie rubber layer selectively disposed on a portion between a carcass layer and innerliner layer, which is capable of reducing tire weight and rolling resistance while maintaining handling stability on a dry road surface.

A pneumatic tire of a first technology includes: an annular-shaped tread portion where a mounting direction with regard to a vehicle is specified, and that extends in a tire circumferential direction; a pair of sidewall portions disposed on both sides of the tread portion; a pair of bead portions disposed on an inner side in a tire radial direction of the sidewall portions; a carcass layer bridging between the pair of bead portions; a belt layer being disposed on an outer circumferential side of the carcass layer in the tread portion; an innerliner layer being disposed on a tire inner surface along the carcass layer; and partial tie rubber layers being selectively disposed between the carcass layer and innerliner layer in a region on both sides in a tire width direction excluding a center region of the tread portion; wherein end portions of the partial tie rubber layers on a tire equator side are disposed within a range of 10 mm to 25 mm on the inner side in the tire width direction from an end portion on an outermost side in the tire width direction of the belt layers; a rubber thickness t1 of an inner tie rubber layer disposed on a vehicle inner side being one of the partial tie rubbers differs from a rubber thickness t2 of an outer tie rubber layer disposed on a vehicle outer side being the other of the partial tie rubbers; and the rubber thickness t2 of the outer tie rubber layer is from 120% to 200% of the rubber thickness t1 of the inner tie rubber layer.

A pneumatic tire of a second technology includes: an annular-shaped tread portion where a mounting direction with regard to a vehicle is specified, and that extends in a tire circumferential direction; a pair of sidewall portions disposed on both sides of the tread portion; a pair of bead portions disposed on an inner side in a tire radial direction of the sidewall portions; a carcass layer bridging between the pair of bead portions; a belt layer being disposed on an outer circumferential side of the carcass layer in the tread portion; an innerliner layer being disposed on a tire inner surface along the carcass layer; and partial tie rubber layers being selectively disposed between the carcass layer and innerliner layer in a region on both sides in a tire width direction excluding a center region of the tread portion; wherein end portions of the partial tie rubber layers on a tire equator side are disposed within a range of from 10 mm to 25 mm on the inner side in the tire width direction from an end portion on an outermost side in the tire width direction of the belt layers; a periphery length x1 of an inner tie rubber layer disposed on a vehicle inner side being one of the partial tie rubbers differs from a periphery length x2 of an outer tie rubber layer disposed on a vehicle outer side being the other of the partial tie rubbers; and a difference Δx between the periphery length x2 of the outer tie rubber layer and the periphery length x1 of the inner tie rubber layer is 0.25 times or less a periphery length X along a tire inner surface from a bead toe to a tire equator.

A pneumatic tire of a third technology includes: an annular-shaped tread portion where a mounting direction with regard to a vehicle is specified, and that extends in a tire circumferential direction; a pair of sidewall portions disposed on both sides of the tread portion; a pair of bead portions disposed on an inner side in a tire radial direction of the sidewall portions; a carcass layer bridging between the pair of bead portions; a belt layer being disposed on an outer circumferential side of the carcass layer in the tread portion; an innerliner layer being disposed on a tire inner surface along the carcass layer; and partial tie rubber layers being selectively disposed between the carcass layer and innerliner layer in a region on both sides in a tire width direction excluding a center region of the tread portion; wherein end portions of the partial tie rubber layers on a tire equator side are disposed within a range of 10 mm to 25 mm on the inner side in the tire width direction from an end portion on an outermost side in the tire width direction of the belt layers; a rubber hardness h1 of an inner tie rubber layer disposed on a vehicle inner side being one of the partial tie rubbers differs from a rubber hardness h2 of an outer tie rubber layer disposed on a vehicle outer side being the other of the partial tie rubbers; and the rubber hardness h2 of the outer tie rubber layer is 105% to 150% of the rubber hardness h1 of the inner tie rubber layer.

In the present technology, a partial tie rubber layer is used, and therefore, tire weight and rolling resistance can be reduced as compared to a conventional pneumatic tire having a full tie rubber layer. At this time, rubber thickness (first technology), periphery length (second technology), and rubber hardness (third technology) vary for an inner tie rubber layer disposed on a vehicle inner side and an outer tie rubber layer disposed on a vehicle outer side, and increase on the outer tie rubber layer more than the inner tie rubber layer, and therefore, the rigidity of a sidewall portion on the vehicle outer side can be increased, and dry handling stability can be maintained at a high degree.

The first technology, second technology, and third technology can be combined with each other. In other words, in the first technology (when setting the rubber thickness), a periphery length x1 of an inner tie rubber layer differs from a periphery length x2 of an outer tie rubber layer, and a difference Δx between the periphery length x2 of the outer tie rubber layer and the periphery length x1 of the inner tie rubber layer is 5 mm or greater and 0.25 times or less a periphery length X of a tire inner surface from a bead toe to a tire equator. Thereby, the rigidity of the sidewall portion on the vehicle outer side can be further enhanced, which is advantageous in enhancing dry handling stability. Note that in the present technology, "periphery length" refers to a length measured along an extension direction of tire components (outer tie rubber layer, inner tie rubber layer, tire inner surface) in a tire meridian cross section.

Furthermore, in the first technology (when setting the rubber thickness) or second technology (when setting the periphery length), a rubber hardness h1 of an inner tie rubber layer differs from a rubber hardness h2 of an outer tie rubber layer, and the rubber hardness h2 of the outer tie rubber layer is preferably from 105% to 150% of the rubber hardness h1 of the inner tie rubber layer. Thereby, the rigidity of the sidewall portion on the vehicle outer side can be further enhanced, which is advantageous in enhancing dry handling stability. Note that "rubber hardness" in the present technology refers to a hardness (referred to as JIS-A hardness) measured at 23° C. by a type A durometer in accordance with JIS (Japanese Industrial Standard) K 6253.

DETAILED DESCRIPTION

A configuration of the present technology is described in detail below while referring to the accompanying drawings.

Figure 1:
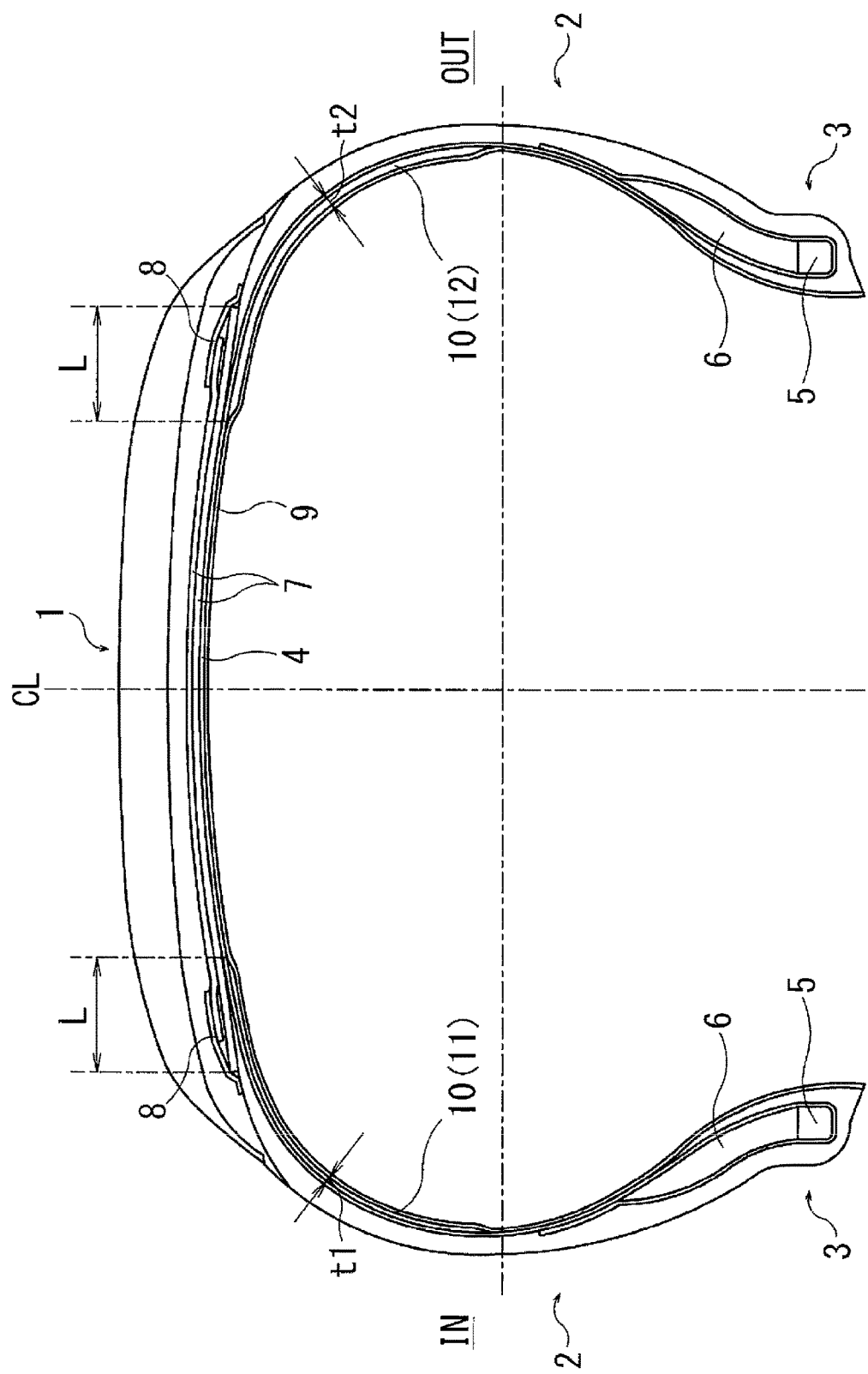
FIG. 1 is a meridian cross-sectional view of a pneumatic tire according to an embodiment of the present technology.
Figure 2:
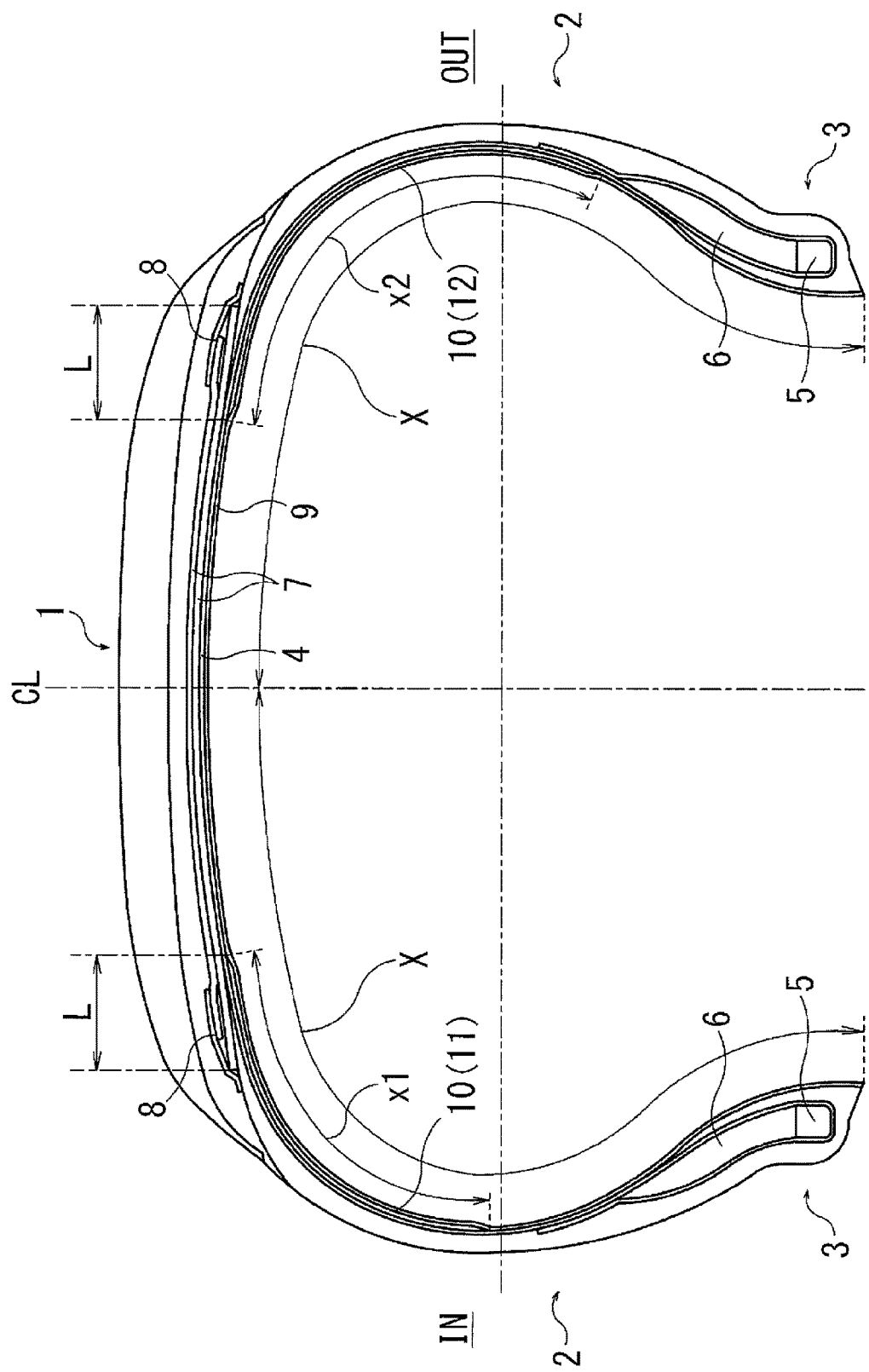
FIG. 2 is a meridian cross-sectional view of a pneumatic tire according to another embodiment of the present technology.
Figure 3:
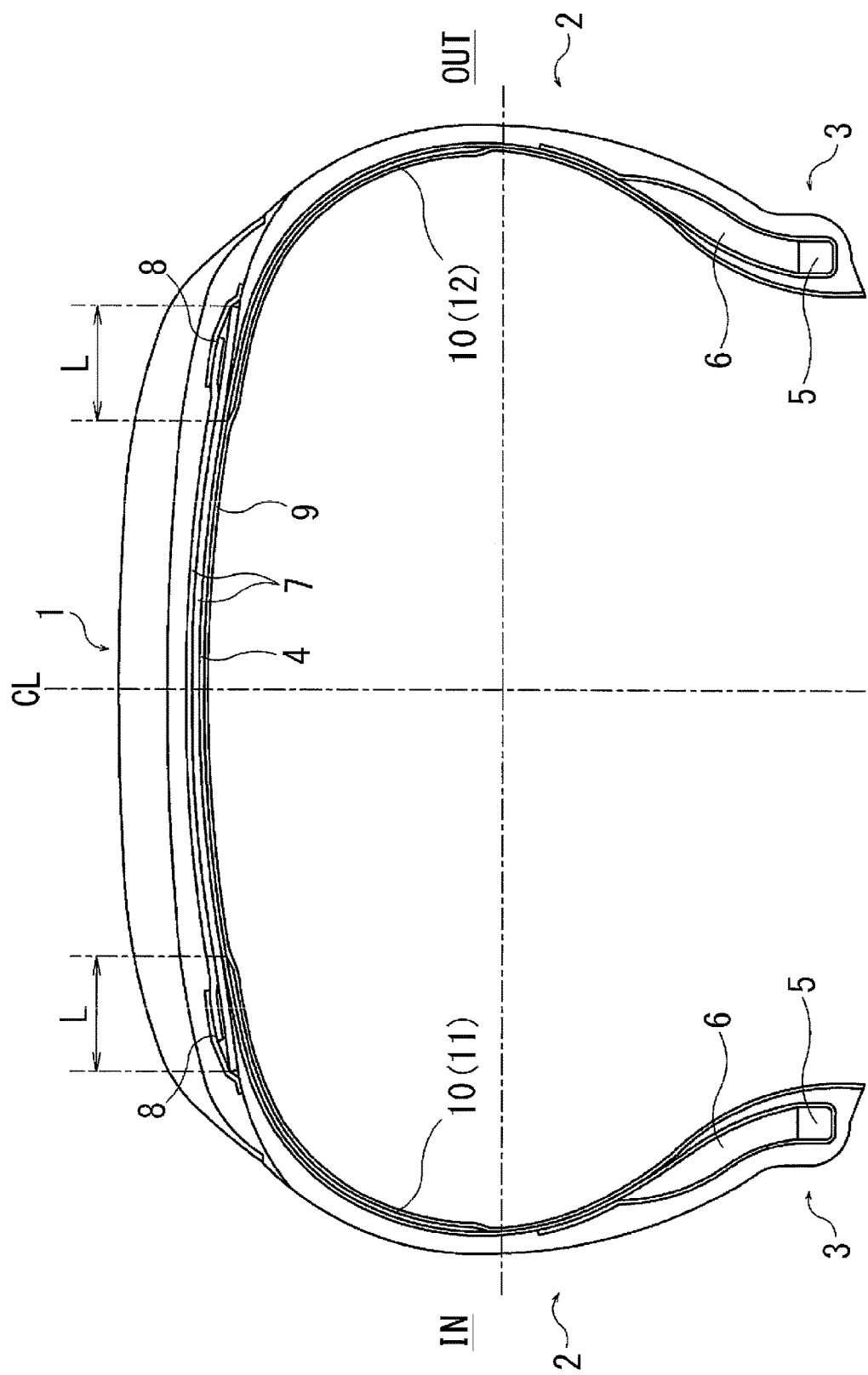
FIG. 3 is a meridian cross-sectional view of a pneumatic tire according to another embodiment of the present technology.

As illustrated in FIGS. 1 to 3, the pneumatic tire of the present technology includes an annular-shaped tread portion 1 extending in a tire circumferential direction, a pair of sidewall portions 2 disposed on both sides of the tread portion 1, and a pair of bead portions 3 disposed on an inner side in a tire radial direction of the sidewall portions 2. Note that in FIGS. 1 to 3, CL denotes a tire equator. For the pneumatic tire, a mounting direction with regard to a car is specified. Specifically, an IN side in the drawings is a side (hereinafter, referred to as vehicle inner side) specified so as to be an inner side with regard to a vehicle when mounting to a vehicle, and an OUT side in the drawings is a side (hereinafter, referred to as vehicle outer side) specified so as to be an outer side with regard to a vehicle when mounting to a vehicle.

A carcass layer 4 is mounted between the left and right pair of bead portions 3. The carcass layer 4 includes a plurality of reinforcing cords extending in a tire radial direction, and is folded back around a bead core 5 disposed in the bead portions 3 from the vehicle inner side to the outer side. Furthermore, a bead filler 6 is disposed on an outer circumference of the bead core 5, and the bead filler 6 is wrapped by a main body portion and the folded back portion of the carcass layer 4. On the other hand, a plurality (two in FIGS. 1 to 3) of belt layers 7 are embedded on the outer circumferential side of the carcass layer 4 on the tread portion 1. The belt layers 7 include a plurality of reinforcing cords that incline with regard to the tire circumferential direction, and are disposed such that the reinforcing cords mutually intersect between layers. In the belt layers 7, an inclination angle of the reinforcing cords with regard to the tire circumferential direction is set within a range of from 10° to 40°, for example. Furthermore, a belt reinforcing layer 8 is provided on the outer circumferential side of the belt layers 7. The belt reinforcing layer 8 includes an organic fiber cord oriented in the tire circumferential direction. In the belt reinforcing layer 8, an angle of the organic fiber cord with regard to the tire circumferential direction is set to from 0° to 5°, for example.

Furthermore, an innerliner layer 9 is provided on a tire inner surface. The innerliner layer 9 is configured from a rubber composition primarily containing butyl rubber having air permeation preventive performance, and thus air filled into the tire is prevented from permeating to the outside of the tire.

A partial tie rubber layer 10 is disposed between the innerliner layer 9 and carcass layer 4. The partial tie rubber layer 10 is a layer for preventing a carcass cord from biting into the innerliner layer 9 when an unvulcanized tire is inflated when manufacturing a tire, but does not cover an entire region between the carcass layer 4 and innerliner 9 as with a conventional tie rubber layer, and is selectively provided in a region excluding the bead portions 3 and a center region of the tread portion 1. In other words, as illustrated in FIG. 1, the partial tie rubber layers 10 are provided in a region on both sides in the tire width direction of a tire equator CL, including the sidewall portions 2 and a shoulder region of the tread portion 1. Specifically, an end portion on a tire equator CL side of the partial tie rubber layers 10 is disposed from an end portion on an outermost side in the tire width direction of the belt layers 7 to an inner side in the tire width direction within a range of from 10 mm to 25 mm. In other words, a distance L in the tire width direction between the end portion on the tire equator CL side of the partial tie rubber layers 10 and the end portion on an outermost side in the tire width direction of the belt layers 7 is set to from 10 mm to 25 mm. On the other hand, an end portion of the partial tie rubber layers 10 on a bead portion 3 side is disposed more on a tread portion 1 side than the bead core 5.

Thereby, the partial tie rubber layers 10 are selectively provided in a specific region, and therefore, tire weight can be reduced as compared to a pneumatic tire having a conventional tie rubber layer (full tie rubber layer) covering an entire region between the carcass layer 4 and innerliner layer 9, and the rolling resistance can be reduced, while maintaining a function as a tie rubber layer. At this time, when the end portion of the partial tie rubber layers 10 on the tire equator CL side is disposed more on the tire equator CL side than the aforementioned range, the amount of partial tie rubber layers 10 increases, and therefore, the tire weight and rolling resistance cannot be sufficiently reduced. When the end portion of the partial tie rubber layers 10 on the tire equator CL side is disposed more on the outer side in the tire width direction than the aforementioned range, biting of the carcass cord into the innerliner layer 9 when inflating cannot be sufficiently prevented.

At this time, in the present technology, of the pair of partial tie rubber layers 10, the structure (dimensions) and physical properties vary for the inner tie rubber layer 11 disposed on the vehicle inner side and outer tie rubber layer 12 disposed on the vehicle outer side, and therefore, the rigidity of the sidewall portion on the vehicle outer side is enhanced, and the dry handling stability performance is prevented from being reduced more than a pneumatic tire having a conventional full tie rubber layer. In other words, excellent dry handling stability equal to or greater than a pneumatic tire having a conventional full tie rubber layer is achieved.

First, in an embodiment in FIG. 1, a rubber thickness t1 of an inner tie rubber layer 11 differs from a rubber thickness t2 of an outer tie rubber 12. Specifically, a rubber thickness t2 of the outer tie rubber layer 12 is set to be thicker than a rubber thickness t1 of the inner tie rubber layer 11, and the rubber thickness t2 of the outer tie rubber layer 12 is set to be from 120% to 200% of the rubber thickness t1 of the inner tie rubber layer 11. At this time, when the rubber thickness t2 is thinner than 120% of the rubber thickness t1, the outer tie rubber layer 12 is not sufficiently thick, the sidewall portion on the vehicle outer side is not appropriately reinforced to enhance rigidity, and dry handling stability performance is not favorable. When the rubber thickness t2 is thicker than 200% of the rubber thickness t1, an effect of reducing the tire weight is reduced. Furthermore, when tire components are laminated during tire manufacturing, a step between a site where a tie rubber layer is present and a site where a tie rubber layer is not present is large, and thus forming into a suitable tire shape is difficult.

Even in a case where the rubber thicknesses t1, t2 of the inner tie rubber layer 11 and outer tie rubber layer 12 satisfy the aforementioned relationship, when the tie rubber layers are significantly thin, a reinforcing effect based on the tie rubber layers cannot be sufficiently expected, and when the layers are significantly thick, an effect of reducing tire weight cannot be sufficiently expected, and therefore, the rubber thickness t1 of the inner tie rubber layer 11 is preferably from 0.5 mm to 0.8 mm, and the rubber thickness t2 of the outer tie rubber layer 12 is preferably from 0.7 to 1.0 mm, for example.

Note that in the illustrated example, the tie rubber layer has a tapered shape where the thickness decreases toward the end portion, but in this case, the rubber thicknesses t1, t2 are preferably determined as average thicknesses obtained by dividing a cross-sectional area of the inner tie rubber layer 11 or outer tie rubber layer 2 in a meridian cross section by a periphery length of the inner tie rubber layer 11 or outer tie rubber layer 12, for example.

Next, in an embodiment in FIG. 2, a periphery length x1 of an inner tie rubber layer 11 differs from a periphery length x2 of an outer tie rubber layer 12. Specifically, a periphery length x2 of the outer tie rubber layer 12 is greater than a periphery length x1 of the inner tie rubber layer 11, and a difference $\Delta x$ between the periphery length x1 and periphery length x2 ($=x2-x1$) is set to 5 mm or greater and is set to be 0.25 times or less a periphery X of a tire inner surface from a bead toe to the tire equator. At this time, when the difference $\Delta x$ is less than 5 mm, the outer tie rubber layer 12 is not sufficiently long, the sidewall portion 2 on the vehicle outer side is not appropriately reinforced to enhance rigidity, and dry handling stability performance is not favorable. When the difference $\Delta x$ is greater than 0.25 times the periphery length X, an effect of reducing the tire weight is reduced. Furthermore, the outer tie rubber layer 12 extends to a vicinity of the bead portions 3, the rigidity of the sidewall portion 2 on the vehicle outer side increases to the vicinity of the bead portions 3, and fittability with regard to a rim is reduced (a difference in fittability with regard to a rim occurs for the vehicle inner side and vehicle outer side).

Even in a case where the periphery lengths x1, x2 of the inner tie rubber layer 11 and outer tie rubber layer 12 satisfy the aforementioned relationship, when the tie rubber layers are significantly short, a reinforcing effect based on the tie rubber layers cannot be sufficiently expected, and when the layers are significantly long, an effect of reducing tire weight cannot be sufficiently expected, and therefore, the periphery length x1 of the inner tie rubber layer 11 is preferably from 40 mm to 70 mm, and the periphery length x2 of the outer tie rubber layer 12 is preferably from 50 to 80 mm, for example.

Furthermore, in an embodiment in FIG. 3, a rubber hardness h1 of an inner tie rubber layer 11 differs from a rubber hardness h2 of an outer tie rubber 12. Specifically, a rubber hardness h2 of the outer tie rubber layer 12 is set to be thicker than a rubber hardness h1 of the inner tie rubber layer 11, and the rubber hardness h2 of the outer tie rubber layer 12 is set to be from 105% to 150% of the rubber hardness h1 of the inner tie rubber layer 11. At this time, when the rubber hardness h2 is lower than 105% of the rubber hardness h1, the outer tie rubber layer 12 is not sufficiently hard, the sidewall portion 2 on the vehicle outer side is not appropriately reinforced to enhance rigidity, and dry handling stability performance is not favorable. When the rubber hardness h2 is higher than 150% of the rubber hardness h1, an effect on the rolling resistance increases, and sufficient reduction of the rolling resistance cannot be expected. Furthermore, the processability and cost deteriorate.

Even in a case where the rubber hardnesses h1, h2 of the inner tie rubber layer 11 and outer tie rubber layer 12 satisfy the aforementioned relationship, when the tie rubber layers are significantly low in hardness, a reinforcing effect based on the tie rubber layers cannot be sufficiently expected, and when the hardness is significantly high, sufficient reduction of rolling resistance cannot be expected, and therefore, the rubber hardness h1 of the inner tie rubber layer 11 is preferably from 55 to 65, and the rubber hardness h2 of the outer tie rubber layer 12 is preferably from 70 to 90, for example.

In the embodiments in FIGS. 1 to 3, the rubber thickness (FIG. 1), periphery length (FIG. 2), and rubber hardness (FIG. 3) were independently varied for the inner tie rubber layer 11 and outer tie rubber layer 12, but of these, two or more parameters may be simultaneously varied. Therefore, by simultaneously varying two or more parameters, a reinforcing effect of the sidewall portion 2 on the vehicle outer side can be enhanced, and thus the dry handling stability can be effectively improved.

Figure 4:
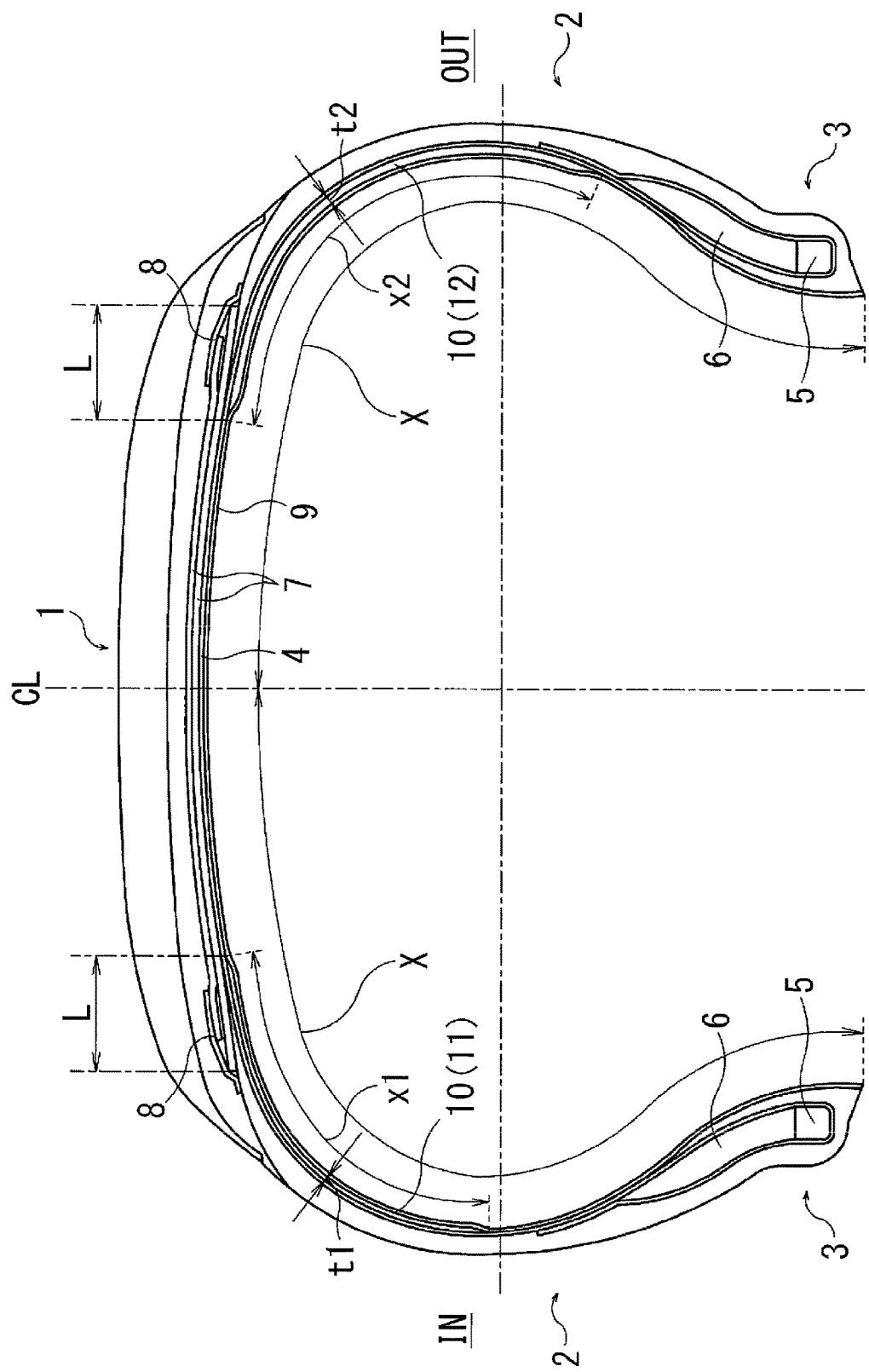
FIG. 4 is a meridian cross-sectional view of a pneumatic tire according to another embodiment of the present technology.

For example, as illustrated in FIG. 4, the rubber thickness and periphery length can be varied for the inner tie rubber layer 11 and outer tie rubber layer 12. In this case, the rubber thickness t2 and periphery length x2 of the outer tie rubber layer 12 is greater than the rubber thickness t1 and periphery length x1 of the inner tie rubber layer 11, and the rubber thicknesses t1, t2 and periphery lengths x1, x2 satisfy the aforementioned relationship. Furthermore, in the structures in FIGS. 1, 2, and 4, the rubber hardnesses h1, h2 of the inner tie rubber layer 11 and outer tie rubber layer 12 can be set to satisfy the aforementioned relationship.

Therefore, when two or more parameters are combined, the range of the parameters is preferably set considering that the magnitude of the effects of the parameters on the tire weight, rolling resistance, and dry handling stability performance varies, or considering the effect on original tire performance based on a synergetic effect. In other words, when the rubber thickness and periphery length are combined, the rubber thickness t2 of the outer tie rubber layer 12 is preferably set to from 140% to 160% of the rubber thickness t1 of the inner tie rubber layer 11, and the difference Δx between the periphery length x2 of the outer tie rubber layer 12 and periphery length x1 of the inner tie rubber layer 11 is preferably set to from 0.025 times to 0.250 times the periphery length X of the tire inner surface from the bead toe to the tire equator. Alternatively, when the rubber thickness and rubber hardness are combined, the rubber thickness t2 of the outer tie rubber layer 12 is preferably set to from 140% to 160% of the rubber thickness t1 of the inner tie rubber layer 11, and the rubber hardness h2 of the outer tie rubber layer 12 is preferably set to from 105% to 150% of the rubber hardness h1 of the inner tie rubber layer 11. Alternatively, when the periphery length and rubber hardness are combined, the difference Δx between the periphery length x2 of the outer tie rubber layer 12 and periphery length x1 of the inner tie rubber layer 11 is preferably set to from 0.05 times to 0.20 times the periphery length X of the tire inner surface from the bead toe to the tire equator, and the rubber hardness h2 of the outer tie rubber layer 12 is preferably set to from 105% to 150% of the rubber hardness h1 of the inner tie rubber layer 11. Alternatively, when the rubber thickness, periphery length, and rubber hardness are all combined, the rubber thickness t2 of the outer tie rubber layer 12 is preferably set to from 120% to 180% of the rubber thickness t1 of the inner tie rubber layer 11, the difference Δx between the periphery length x2 of the outer tie rubber layer 12 and periphery length x1 of the inner tie rubber layer 11 is preferably set to from 0.08 times to 0.15 times the tire inner surface from the bead toe to the tire equator, and the rubber hardness h2 of the outer tie rubber layer 12 is preferably set to from 120% to 150% of the rubber hardness h1 of the inner tie rubber layer 11.

EXAMPLES 45 types of pneumatic tires of Conventional Example 1, Comparative Examples 1 to 7, and Examples 1 to 37 were prepared, having a tire size of 195/65 R15, having the basic structure common to FIGS. 1 to 4, and for a partial tie rubber layer, the following were set as shown in Tables 1 to 3: rubber thickness t1 of an inner tie rubber layer; rubber thickness t2 of an outer tie rubber layer; ratio (t2/t1×100) of the rubber thickness t2 with regard to the rubber thickness t1; periphery length x1 of the inner tie rubber layer; periphery length x2 of the outer tie rubber layer; difference Δx between the periphery length x1 of the inner tie rubber layer and periphery length x2 of the outer tie rubber layer; ratio of the difference Δx of the periphery length with regard to a periphery length X of a tire inner surface from a bead toe to a tire equator; rubber hardness h1 of the inner tie rubber layer; rubber hardness h2 of the outer tie rubber layer; and ratio of the rubber hardness h2 with regard to the rubber hardness h1 (h2/h1×100).

Note that Conventional Example 1 is an example where a full tie rubber layer is provided. The rubber thickness of the full tie rubber layer is 0.5 mm, the rubber hardness is 60, and the periphery length matches the periphery length X of the tire inner surface from the bead toe to the tire equator.

In Comparative Examples 1 to 7 and Examples 1 to 37, end portions on a tire equator side of partial tie rubber layers are disposed at a position 20 mm to an inner side in a tire width direction from end portions on an outermost side in the tire width direction of belt layers.

For the 45 types of pneumatic tires, the tire weight, rolling resistance, and dry handling stability performance were evaluated based on the following evaluation methods, and the results thereof are collectively shown in Tables 1 to 3.

Tire Weight

The weight of each test tire was measured. Evaluation results are expressed as indexes where the reciprocal of the measured value of Conventional Example 1 is set as 100. Higher indexes indicate lower tire weight. Note that an index that is "99" or higher indicates that a conventional level was maintained and sufficient dry handling stability was achieved.

Rolling Resistance

The test tires were mounted to a wheel with a 15×6J rim size, and a drum testing machine with a drum diameter of 1707.6 mm was used to measure rolling resistance under a 210 kPa air pressure, 4.82 kN load, and 80 km/h speed conditions. Evaluation results are expressed as indexes with reciprocals of measured values of Conventional Example 1 set as 100. Higher index values indicate lower rolling resistance.

Dry Handling Stability Performance

The test tires were mounted to a wheel with a 15×6J rim size, and mounted to a test vehicle with an engine displacement of 1.5 L with air pressure set at 210 kPa, and sensory evaluation by a test driver was performed on a test course with a dry road surface. Evaluation results are expressed as indexes with Conventional Example 1 set as 100. Larger indexes indicate excellent dry handling stability. Note that an index that is "95" or higher indicates that a conventional level was maintained and sufficient dry handling stability was achieved.

TABLE 1

| | | | Conventional Example 1 | Comparative Example 1 | Example 1 | Example 2 | Example 3 |
|---|---|---|---|---|---|---|---|
| Thickness | t1 | mm | — | 0.5 | 0.5 | 0.5 | 0.5 |
| | t2 | mm | — | 0.5 | 0.6 | 0.7 | 0.8 |
| | t2/t1 × 100 | % | — | 100 | 120 | 140 | 160 |
| Length | x1 | mm | — | 60 | 60 | 60 | 60 |
| | x2 | mm | — | 60 | 60 | 60 | 60 |
| | Δx | mm | — | 0 | 0 | 0 | 0 |
| | Δx/X | | — | 0 | 0 | 0 | 0 |
| Hardness | h1 | | — | 60 | 60 | 60 | 60 |
| | h2 | | — | 60 | 60 | 60 | 60 |
| | h2/h1 × 100 | % | — | 100 | 100 | 100 | 100 |

TABLE 1-continued

|  |  |  |  |  |  |  |
|---|---|---|---|---|---|---|
| Tire weight | Index value | 100 | 105 | 104 | 103 | 102 |
| Rolling resistance | Index value | 100 | 110 | 108 | 107 | 105 |
| Dry Handling Stability | Index value | 100 | 90 | 95 | 97 | 99 |

|  |  |  | Example 4 | Comparative Example 2 | Comparative Example 3 | Example 5 | Example 6 |
|---|---|---|---|---|---|---|---|
| Thickness | t1 | mm | 0.5 | 0.5 | 0.5 | 0.6 | 0.7 |
|  | t2 | mm | 1.0 | 1.2 | 1.5 | 1.0 | 1.0 |
|  | t2/t1 × 100 | % | 200 | 240 | 300 | 167 | 143 |
| Length | x1 | mm | 60 | 60 | 60 | 60 | 60 |
|  | x2 | mm | 60 | 60 | 60 | 60 | 60 |
|  | Δx | mm | 0 | 0 | 0 | 0 | 0 |
|  | Δx/X |  | 0 | 0 | 0 | 0 | 0 |
| Hardness | h1 |  | 60 | 60 | 60 | 60 | 60 |
|  | h2 |  | 60 | 60 | 60 | 60 | 60 |
|  | h2/h1 × 100 | % | 100 | 100 | 100 | 100 | 100 |
| Tire weight | Index value |  | 101 | 99 | 96 | 100 | 99 |
| Rolling resistance | Index value |  | 102 | 98 | 95 | 103 | 106 |
| Dry Handling Stability | Index value |  | 100 | 103 | 103 | 99 | 98 |

|  |  |  | Example 7 | Comparative Example 4 | Example 8 | Example 9 | Example 10 | Comparative Example 5 |
|---|---|---|---|---|---|---|---|---|
| Thickness | t1 | mm | 0.8 | 0.5 | 0.5 | 0.5 | 0.5 | 0.5 |
|  | t2 | mm | 1.0 | 0.5 | 0.5 | 0.5 | 0.5 | 0.5 |
|  | t2/t1 × 100 | % | 125 | 100 | 100 | 100 | 100 | 100 |
| Length | x1 | mm | 60 | 60 | 60 | 60 | 60 | 60 |
|  | x2 | mm | 60 | 63 | 65 | 80 | 110 | 140 |
|  | Δx | mm | 0 | 3 | 5 | 20 | 50 | 80 |
|  | Δx/X |  | 0 | 0.015 | 0.025 | 0.100 | 0.250 | 0.400 |
| Hardness | h1 |  | 60 | 60 | 60 | 60 | 60 | 60 |
|  | h2 |  | 60 | 60 | 60 | 60 | 60 | 60 |
|  | h2/h1 × 100 | % | 100 | 100 | 100 | 100 | 100 | 100 |
| Tire weight | Index value |  | 99 | 104 | 104 | 103 | 100 | 97 |
| Rolling resistance | Index value |  | 107 | 109 | 108 | 106 | 103 | 98 |
| Dry Handling Stability | Index value |  | 96 | 93 | 96 | 98 | 100 | 101 |

TABLE 2

|  |  |  | Example 11 | Example 12 | Example 13 | Comparative Example 6 | Example 14 |
|---|---|---|---|---|---|---|---|
| Thickness | t1 | mm | 0.5 | 0.5 | 0.5 | 0.5 | 0.5 |
|  | t2 | mm | 0.5 | 0.5 | 0.5 | 0.5 | 0.5 |
|  | t2/t1 × 100 | % | 100 | 100 | 100 | 100 | 100 |
| Length | x1 | mm | 40 | 50 | 70 | 60 | 60 |
|  | x2 | mm | 75 | 75 | 75 | 60 | 60 |
|  | Δx | mm | 35 | 25 | 5 | 0 | 0 |
|  | Δx/X |  | 0.175 | 0.125 | 0.025 | 0 | 0 |
| Hardness | h1 |  | 60 | 60 | 60 | 60 | 60 |
|  | h2 |  | 60 | 60 | 60 | 61 | 63 |
|  | h2/h1 × 100 | % | 100 | 100 | 100 | 102 | 105 |
| Tire weight | Index value | 105 | 104 | 102 | 105 | 105 |
| Rolling resistance | Index value | 108 | 107 | 106 | 110 | 108 |
| Dry Handling Stability | Index value | 99 | 98 | 97 | 93 | 95 |

|  |  |  | Example 15 | Example 16 | Comparative Example 7 | Example 17 | Example 18 |
|---|---|---|---|---|---|---|---|
| Thickness | t1 | mm | 0.5 | 0.5 | 0.5 | 0.5 | 0.5 |
|  | t2 | mm | 0.5 | 0.5 | 0.5 | 0.5 | 0.5 |
|  | t2/t1 × 100 | % | 100 | 100 | 100 | 100 | 100 |
| Length | x1 | mm | 60 | 60 | 60 | 60 | 60 |
|  | x2 | mm | 60 | 60 | 60 | 60 | 60 |

TABLE 2-continued

|  |  |  |  |  |  |  |  |
|---|---|---|---|---|---|---|---|
|  | $\Delta x$ | mm | 0 | 0 | 0 | 0 | 0 |
|  | $\Delta x/X$ |  | 0 | 0 | 0 | 0 | 0 |
| Hardness | h1 |  | 60 | 60 | 60 | 55 | 65 |
|  | h2 |  | 75 | 90 | 100 | 80 | 80 |
|  | h2/h1 × 100 | % | 125 | 150 | 167 | 145 | 123 |
| Tire weight |  | Index value | 105 | 104 | 104 | 105 | 105 |
| Rolling resistance |  | Index value | 106 | 102 | 98 | 104 | 106 |
| Dry Handling Stability |  | Index value | 98 | 100 | 100 | 99 | 99 |

|  |  |  | Example 19 | Example 20 | Example 21 | Example 22 | Example 23 | Example 24 |
|---|---|---|---|---|---|---|---|---|
| Thickness | t1 | mm | 0.5 | 0.5 | 0.5 | 0.5 | 0.5 | 0.5 |
|  | t2 | mm | 0.5 | 0.8 | 0.8 | 0.8 | 0.75 | 0.7 |
|  | t2/t1 × 100 | % | 100 | 160 | 160 | 160 | 150 | 140 |
| Length | x1 | mm | 60 | 60 | 50 | 40 | 60 | 60 |
|  | x2 | mm | 60 | 65 | 80 | 80 | 80 | 80 |
|  | $\Delta x$ | mm | 0 | 5 | 30 | 40 | 20 | 20 |
|  | $\Delta x/X$ |  | 0 | 0.025 | 0.150 | 0.200 | 0.100 | 0.100 |
| Hardness | h1 |  | 70 | 60 | 60 | 60 | 60 | 60 |
|  | h2 |  | 80 | 60 | 60 | 60 | 60 | 60 |
|  | h2/h1 × 100 | % | 114 | 100 | 100 | 100 | 100 | 100 |
| Tire weight |  | Index value | 104 | 101 | 99 | 100 | 99 | 100 |
| Rolling resistance |  | Index value | 100 | 103 | 101 | 102 | 101 | 97 |
| Dry Handling Stability |  | Index value | 100 | 104 | 106 | 108 | 105 | 103 |

TABLE 3

|  |  |  | Example 25 | Example 26 | Example 27 | Example 28 | Example 29 | Example 30 |
|---|---|---|---|---|---|---|---|---|
| Thickness | t1 | mm | 0.5 | 0.5 | 0.5 | 0.5 | 0.5 | 0.5 |
|  | t2 | mm | 0.8 | 0.8 | 0.8 | 0.75 | 0.7 | 0.5 |
|  | t2/t1 × 100 | % | 160 | 160 | 160 | 150 | 140 | 100 |
| Length | x1 | mm | 60 | 60 | 60 | 60 | 60 | 60 |
|  | x2 | mm | 60 | 60 | 60 | 60 | 60 | 80 |
|  | $\Delta x$ | mm | 0 | 0 | 0 | 0 | 0 | 20 |
|  | $\Delta x/X$ |  | 0 | 0 | 0 | 0 | 0 | 0.100 |
| Hardness | h1 |  | 60 | 60 | 60 | 60 | 60 | 60 |
|  | h2 |  | 63 | 75 | 85 | 75 | 75 | 63 |
|  | h2/h1 × 100 | % | 105 | 125 | 142 | 125 | 125 | 105 |
| Tire weight |  | Index value | 101 | 101 | 100 | 102 | 103 | 103 |
| Rolling resistance |  | Index value | 103 | 101 | 100 | 102 | 103 | 104 |
| Dry Handling Stability |  | Index value | 103 | 106 | 108 | 104 | 103 | 103 |

|  |  |  | Example 31 | Example 32 | Example 33 | Example 34 | Example 35 | Example 36 | Example 37 |
|---|---|---|---|---|---|---|---|---|---|
| Thickness | t1 | mm | 0.5 | 0.5 | 0.5 | 0.5 | 0.5 | 0.5 | 0.5 |
|  | t2 | mm | 0.5 | 0.5 | 0.5 | 0.5 | 0.7 | 0.75 | 0.8 |
|  | t2/t1 × 100 | % | 100 | 100 | 100 | 100 | 140 | 150 | 160 |
| Length | x1 | mm | 60 | 60 | 60 | 60 | 60 | 60 | 60 |
|  | x2 | mm | 80 | 80 | 70 | 100 | 78 | 75 | 70 |
|  | $\Delta x$ | mm | 20 | 20 | 10 | 40 | 18 | 15 | 10 |
|  | $\Delta x/X$ |  | 0.100 | 0.100 | 0.050 | 0.200 | 0.090 | 0.075 | 0.050 |
| Hardness | h1 |  | 60 | 60 | 60 | 60 | 60 | 60 | 60 |
|  | h2 |  | 75 | 85 | 75 | 75 | 75 | 80 | 85 |
|  | h2/h1 × 100 | % | 125 | 142 | 125 | 125 | 125 | 133 | 142 |
| Tire weight |  | Index value | 103 | 103 | 104 | 101 | 100 | 100 | 99 |
| Rolling resistance |  | Index value | 102 | 100 | 104 | 101 | 100 | 101 | 100 |
| Dry Handling Stability |  | Index value | 106 | 108 | 104 | 108 | 114 | 115 | 116 |

As seen from Tables 1 to 3, Examples 1 to 37 all had reduced tire weight and rolling resistance while maintaining dry handling stability performance, as compared to Conventional Example 1. In particular, Examples 10 to 30 where two or more parameters of the rubber thickness, periphery length, and rubber hardness were set to a suitable range had improved dry handling stability performance as compared to the Conventional Example 1, while reducing tire weight and rolling resistance.

On the other hand, although Comparative Example 1 had partial tie rubber layers, the inner tie rubber layer and outer tie rubber layer were both identical, and therefore, dry handling stability performance was reduced as compared to Conventional Example 1. Comparative Examples 2 and 3 had an outer tie rubber layer that was too thick with regard to the inner tie rubber layer, and therefore, the tire weight and rolling resistance could not be reduced. Comparative Example 4 had an outer tie rubber layer that was not sufficiently long with regard to the inner tie rubber layer, and therefore, dry handling stability performance could not be maintained. Comparative Example 5 had an outer tie rubber layer that was too long with regard to the inner tie rubber layer, and reached a vicinity of the bead portion, and therefore, the tire weight and rolling resistance could not be reduced. Comparative Example 6 had an outer tie rubber layer that did not have a high degree of hardness with regard to the inner tie rubber layer, and therefore, dry handling stability performance could not be maintained. Comparative Example 7 had an outer tie rubber layer with a significantly high degree of hardness with regard to the inner tie rubber layer, and therefore, rolling resistance could not be reduced, and the rolling resistance was about the same as Conventional Example 1.

The invention claimed is:

1. A pneumatic tire, comprising:
an annular-shaped tread portion where a mounting direction with regard to a vehicle is specified, and that extends in a tire circumferential direction;
a pair of sidewall portions disposed on both sides of the tread portion;
a pair of bead cores disposed on an inner side in a tire radial direction of the sidewall portions;
a carcass layer bridging between the pair of bead cores;
a belt layer being disposed on an outer circumferential side of the carcass layer in the tread portion;
an innerliner layer being disposed on a tire inner surface along the carcass layer; and
partial tie rubber layers being selectively disposed between the carcass layer and innerliner layer in a region on both sides in a tire width direction excluding a center region of the tread portion; wherein
end portions of the partial tie rubber layers on a tire equator side are disposed within a range of from 10 mm to 25 mm on the inner side in the tire width direction from an end portion on an outermost side in the tire width direction of the belt layers;
end portions of the partial tie rubber layers on outermost sides opposite the end portions on the tire equator side terminate radially outwardly of a radially outermost position of the bead cores;
a rubber thickness t1 of an inner tie rubber layer disposed on a vehicle inner side being one of the partial tie rubbers differs from a rubber thickness t2 of an outer tie rubber layer disposed on a vehicle outer side being the other of the partial tie rubbers;
the rubber thickness t2 of the outer tie rubber layer is from 120% to 200% of the rubber thickness t1 of the inner tie rubber layer;
the rubber thickness t1 is from 0.5 mm to 0.8 mm; and
the rubber thickness t2 is from 0.7 mm to 1.0 mm.

2. The pneumatic tire according to claim 1, wherein a periphery length x1 of an inner tie rubber layer differs from a periphery length x2 of an outer tie rubber layer, and a difference Δx between the periphery length x2 of the outer tie rubber layer and the periphery length x1 of the inner tie rubber layer is 5 mm or greater and 0.25 times or less a periphery length X of a tire inner surface from a bead toe to a tire equator.

3. The pneumatic tire according to claim 2, wherein a rubber hardness h1 of an inner tie rubber layer differs from a rubber hardness h2 of an outer tie rubber layer, and the rubber hardness h2 of the outer tie rubber layer is from 105% to 150% of the rubber hardness h1 of the inner tie rubber layer.

4. The pneumatic tire according to claim 1, wherein a rubber hardness h1 of an inner tie rubber layer differs from a rubber hardness h2 of an outer tie rubber layer, and the rubber hardness h2 of the outer tie rubber layer is from 105% to 150% of the rubber hardness h1 of the inner tie rubber layer.

5. The pneumatic tire according to claim 1, wherein at least one of the end portions on the outermost sides terminates radially outwardly of a tire maximum width position of the pneumatic tire.

6. A pneumatic tire, comprising:
an annular-shaped tread portion where a mounting direction with regard to a vehicle is specified, and that extends in a tire circumferential direction;
a pair of sidewall portions disposed on both sides of the tread portion;
a pair of bead cores disposed on an inner side in a tire radial direction of the sidewall portions;
a carcass layer bridging between the pair of bead cores, the carcass layer being a single carcass layer and being the only carcass layer of the pneumatic tire, the carcass layer having a folded back end terminating radially inward of the tire maximum width position;
a belt layer being disposed on an outer circumferential side of the carcass layer in the tread portion;
an innerliner layer being disposed on a tire inner surface along the carcass layer; and
partial tie rubber layers being selectively disposed between the carcass layer and innerliner layer in a region on both sides in a tire width direction excluding a center region of the tread portion; wherein
end portions of the partial tie rubber layers on a tire equator side are disposed within a range of from 10 mm to 25 mm on the inner side in the tire width direction from an end portion on an outermost side in the tire width direction of the belt layers;
end portions of the partial tie rubber layers on outermost sides opposite the end portions on the tire equator side terminate radially outwardly of a radially outermost position of the bead cores;
a periphery length x1 of an inner tie rubber layer disposed on a vehicle inner side being one of the partial tie rubbers differs from a periphery length x2 of an outer tie rubber layer disposed on a vehicle outer side being the other of the partial tie rubbers;
a difference Δx between the periphery length x2 of the outer tie rubber layer and the periphery length x1 of the inner tie rubber layer is 0.25 times or less a periphery length X along a tire inner surface from a bead toe to a tire equator;

the periphery length x1 is from 40 mm to 70 mm; and the periphery length x2 is from 50 mm to 80 mm.

7. The pneumatic tire according to claim 6, wherein a rubber hardness h1 of an inner tie rubber layer differs from a rubber hardness h2 of an outer tie rubber layer, and the rubber hardness h2 of the outer tie rubber layer is from 105% to 150% of the rubber hardness h1 of the inner tie rubber layer.

8. The pneumatic tire according to claim 6, wherein at least one of the end portions on the outermost sides terminates radially outwardly of a tire maximum width position of the pneumatic tire.

9. A pneumatic tire, comprising:

an annular-shaped tread portion where a mounting direction with regard to a vehicle is specified, and that extends in a tire circumferential direction;

a pair of sidewall portions disposed on both sides of the tread portion;

a pair of bead cores disposed on an inner side in a tire radial direction of the sidewall portions;

a carcass layer bridging between the pair of bead cores, the carcass layer being a single carcass layer and being the only carcass layer of the pneumatic tire, the carcass layer having a folded back end terminating radially inward of the tire maximum width position;

a belt layer being disposed on an outer circumferential side of the carcass layer in the tread portion;

an innerliner layer being disposed on a tire inner surface along the carcass layer; and partial tie rubber layers being selectively disposed between the carcass layer and innerliner layer in a region on both sides in a tire width direction excluding a center region of the tread portion; wherein end portions of the partial tie rubber layers on a tire equator side are disposed within a range of from 10 mm to 25 mm on the inner side in the tire width direction from an end portion on an outermost side in the tire width direction of the belt layers;

end portions of the partial tie rubber layers on outermost sides opposite the end portions on the tire equator side terminate radially outwardly of a radially outermost position of the bead cores;

a rubber hardness h1 of an inner tie rubber layer disposed on a vehicle inner side being one of the partial tie rubbers differs from a rubber hardness h2 of an outer tie rubber layer disposed on a vehicle outer side being the other of the partial tie rubbers;

the rubber hardness h2 of the outer tie rubber layer is from 105% to 150% of the rubber hardness h1 of the inner tie rubber layer;

the rubber hardness h1 is from 55 to 65; and the rubber hardness h2 is from 70 to 90.

10. The pneumatic tire according to claim 9, wherein at least one of the end portions on the outermost sides terminates radially outwardly of a tire maximum width position of the pneumatic tire.

* * * * *